US007007023B2

(12) United States Patent
Huynh et al.

(10) Patent No.: US 7,007,023 B2
(45) Date of Patent: Feb. 28, 2006

(54) METHOD FOR FLAGGING DIFFERENCES IN RESOURCE ATTRIBUTES ACROSS MULTIPLE DATABASE AND TRANSACTION SYSTEMS

(75) Inventors: Bill Thanh Huynh, Oakland, CA (US); Kevin Michael McBride, Mountain View, CA (US); Mehul Mahendra Shah, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/230,210

(22) Filed: Aug. 27, 2002

(65) Prior Publication Data

US 2004/0044685 A1    Mar. 4, 2004

(51) Int. Cl.
*G06F 17/30* (2006.01)
(52) U.S. Cl. .............................. 707/8; 707/10
(58) Field of Classification Search ............... None
See application file for complete search history.

(56) References Cited

U.S. PATENT DOCUMENTS

| | | | |
|---|---|---|---|
| 5,226,120 A | 7/1993 | Brown et al. ................ 395/200 |
| 5,262,944 A | 11/1993 | Weisner et al. ......... 364/413.02 |
| 5,471,399 A | 11/1995 | Tamaka et al. ............. 364/491 |
| 5,483,631 A | 1/1996 | Nagai et al. ................. 395/155 |
| 5,491,796 A | 2/1996 | Wanderer et al. ....... 395/200.09 |
| 5,684,967 A | 11/1997 | McKenna et al. ........... 395/329 |
| 5,748,098 A | 5/1998 | Grace .................... 340/825.16 |
| 5,751,965 A | 5/1998 | Mayo et al. ............ 395/200.54 |
| 5,761,429 A | 6/1998 | Thompson .............. 395/200.54 |
| 5,790,424 A | 8/1998 | Sugihara et al. ........ 364/551.01 |
| 5,909,550 A | 6/1999 | Shankar et al. ......... 395/200.57 |
| 5,928,328 A | 7/1999 | Komori et al. .............. 709/223 |
| 5,940,828 A * | 8/1999 | Anaya et al. .................... 707/8 |
| 5,987,515 A | 11/1999 | Ratcliff et al. ............... 709/224 |
| 6,009,467 A | 12/1999 | Ratcliff et al. ............... 709/224 |
| 6,046,742 A | 4/2000 | Chari .......................... 345/349 |
| 6,292,889 B1 | 9/2001 | Fitgerald et al. ................ 713/1 |
| 6,324,555 B1 | 11/2001 | Sites .......................... 700/517 |
| 2001/0029530 A1 | 10/2001 | Naito et al. .................. 709/223 |
| 2001/0044840 A1 | 11/2001 | Caleton ....................... 709/223 |
| 2002/0023105 A1 | 2/2002 | Wisniewski ................. 707/503 |

* cited by examiner

*Primary Examiner*—Jean M. Corrielus
*Assistant Examiner*—Joon Hwan Hwang
(74) *Attorney, Agent, or Firm*—Samuel A. Kassatly

(57) ABSTRACT

A system and associated method for flagging differences in resource attributes across multiple database and transaction systems, to substantially improve database maintenance operations performed by database administrators. The system and method perform search for object attributes that define a resource across a large number of database systems, and return the information to a database administrator, with the information in an exception state flagged. The system and method offer significant advantages for database administration in the ability to simplify the views of multiple systems into a single system image, and the ability to provide a significant degree of flexibility in displaying database information, thus making it relatively easy to identify resources that do not necessarily conform to the single system definition. These features substantially enhance the efficiency of database administration operations and reduce the labor demand associated with performing two-dimensional searches for exception states.

32 Claims, 9 Drawing Sheets

20

| Name | Member | Local Class | Segment Size | Status |
|---|---|---|---|---|
| TRAN1 | IMS1 | 1 | 0 | Stopped |
| TRAN2 | IMS1 | 2 | 4 | Stopped |
| TRAN3 | IMS1 | 3 | 0 | Active |
| TRAN4 | IMS1 | 4 | 0 | Active |
| TRAN5 | IMS1 | 5 | 0 | Active |
| TRAN6 | IMS1 | 6 | 0 | Active |
| TRAN1 | IMS2 | 1 | 0 | Stopped |
| TRAN2 | IMS2 | 2 | 4 | Stopped |
| TRAN3 | IMS2 | 3 | 0 | Active |
| TRAN4 | IMS2 | 4 | 0 | Active |
| TRAN5 | IMS2 | 5 | 0 | Active |
| TRAN6 | IMS2 | 6 | 0 | Active |
| TRAN1 | IMS3 | 2 | 0 | Stopped |
| TRAN2 | IMS3 | 2 | 4 | Active |
| TRAN3 | IMS3 | 3 | 0 | Active |
| TRAN4 | IMS3 | 4 | 0 | Active |
| TRAN5 | IMS3 | 5 | 4 | Active |
| TRAN6 | IMS3 | 6 | 0 | Active |
| TRAN1 | IMS4 | 1 | 0 | Stopped |
| TRAN2 | IMS4 | 2 | 0 | Active |
| TRAN3 | IMS4 | 3 | 0 | Active |
| TRAN4 | IMS4 | 4 | 0 | Active |
| TRAN5 | IMS4 | 5 | 0 | Active |
| TRAN6 | IMS4 | 6 | 0 | Active |

RESOURCE 30: Name (40), Member (45)
ATTRIBUTE 35: Local Class (55), Segment Size (60), Status (65)

(PRIOR ART)

RESOURCE 305      ATTRIBUTE 310

315    115    320    325    330

| Name | Member | Local Class | Segment Size | Status |
|---|---|---|---|---|
| TRAN1 | IMS1 | 1 | 0 | Stopped |
| TRAN2 | IMS1 | 2 | 4 | Stopped |
| TRAN3 | IMS1 | 3 | 0 | Active |
| TRAN4 | IMS1 | 4 | 0 | Active |
| TRAN5 | IMS1 | 5 | 0 | Active |
| TRAN6 | IMS1 | 6 | 0 | Active |
| TRAN1 | IMS2 | 1 | 0 | Stopped |
| TRAN2 | IMS2 | 2 | 4 | Stopped |
| TRAN3 | IMS2 | 3 | 0 | Active |
| TRAN4 | IMS2 | 4 | 0 | Active |
| TRAN5 | IMS2 | 5 | 0 | Active |
| TRAN6 | IMS2 | 6 | 0 | Active |
| TRAN1 | IMS3 | 2 | 0 | Stopped |
| TRAN2 | IMS3 | 2 | 4 | Active |
| TRAN3 | IMS3 | 3 | 0 | Active |
| TRAN4 | IMS3 | 4 | 0 | Active |
| TRAN5 | IMS3 | 5 | 4 | Active |
| TRAN6 | IMS3 | 6 | 0 | Active |
| TRAN1 | IMS4 | 1 | 0 | Stopped |
| TRAN2 | IMS4 | 2 | 0 | Active |
| TRAN3 | IMS4 | 3 | 0 | Active |
| TRAN4 | IMS4 | 4 | 0 | Active |
| TRAN5 | IMS4 | 5 | 0 | Active |
| TRAN6 | IMS4 | 6 | 0 | Active |

| 335 | 340 | 345 | 350 | 355 | 360 |
|---|---|---|---|---|---|

RESOURCE 305 | ATTRIBUTE 310

| | Name | Member | Local Class | Segment Size | Status |
|---|---|---|---|---|---|
| v | TRAN1 | | | | 405 |
| | TRAN1 | IMS1 | 1 | 0 | Stopped |
| | TRAN1 | IMS2 | 1 | 0 | Stopped |
| | TRAN1 | IMS3 | 2 | 0 | Stopped |
| | TRAN1 | IMS4 | 1 | 0 | Stopped |
| v | TRAN2 | | | | 405 |
| | TRAN2 | IMS1 | 2 | 4 | Stopped |
| | TRAN2 | IMS2 | 2 | 4 | Stopped |
| | TRAN2 | IMS3 | 2 | 4 | Active |
| | TRAN2 | IMS4 | 2 | 4 | Active |
| v | TRAN5 | | | | 405 |
| | TRAN5 | IMS1 | 3 | 0 | Active |
| | TRAN5 | IMS2 | 3 | 0 | Active |
| | TRAN5 | IMS3 | 3 | 4 | Active |
| | TRAN5 | IMS4 | 3 | 0 | Active |
| > | TRAN3 | | | | 405 |
| > | TRAN4 | | | | 405 |
| > | TRAN6 | | | | 405 |

RESOURCE 305

| | Name | Member | Status |
|---|---|---|---|
| V | TRAN2 | | 405 |
| | TRAN2 | IMS1 | Stopped |
| | TRAN2 | IMS2 | Stopped |
| | TRAN2 | IMS3 | Active |
| | TRAN2 | IMS4 | Active |
| > | TRAN1 | | 405 |
| > | TRAN3 | | 405 |
| > | TRAN4 | | 405 |
| > | TRAN5 | | 405 |
| > | TRAN6 | | 405 |

RESOURCE 305

| | Name | Member | Status |
|---|---|---|---|
| V | TRAN2 | | 405 |
| | TRAN2 | IMS1 | Active |
| | TRAN2 | IMS2 | Active |
| | TRAN2 | IMS3 | Active |
| | Missing TRAN2 | IMS4 | |
| > | TRAN1 | | 405 |
| > | TRAN3 | | 405 |
| > | TRAN4 | | 405 |
| > | TRAN5 | | 405 |
| > | TRAN6 | | 405 |

| 335 | 340 | 345 | 350 | 355 | 360 |
|---|---|---|---|---|---|

METHOD FOR FLAGGING DIFFERENCES IN RESOURCE ATTRIBUTES ACROSS MULTIPLE DATABASE AND TRANSACTION SYSTEMS

FIELD OF INVENTION

The present invention generally relates to hierarchical database and transaction management systems, and particularly to a method for flagging differences in resource attributes across multiple database and transaction systems, to substantially improve maintenance operations performed by database administrators. More specifically, this invention performs searches for object attributes that define a resource across a large number of database systems, and returns the information to a database administrator, with the information in an exception state flagged.

BACKGROUND OF THE INVENTION

Large enterprise application solutions typically use database management systems (DBMS) such as IMS, DB2®, Informix®, Oracle®, MS SQL Server®, and others to store and retrieve data. These database management systems are found in every aspect of the society ranging from business sectors to government institutions. Because of the wide ranging applications, the schemas for these solutions are frequently very complex, including tens of thousands of segments/tables and indexes or more. Concomitantly, the number of objects in these database management systems generally pose significant challenges to typical database administration (DBA) operations such as backup, reorganization, statistics collection, and database space growth management.

Large database and transaction management systems are often designed to share databases or message queues across multiple computer systems. These systems are also referred to as datasharing systems and the members of these systems are referred to as subsystems.

Datasharing systems allow parallel processing and workload sharing for many functions among the subsystems. More importantly, datasharing systems provide many other significant advantages over single (or central) systems including easier scaling to add capacity, lower cost through complete utilization of existing resources, and continuous availability of data and application transactions.

In another aspect, because of the mission critical nature of enterprise database systems, unscheduled application outage or unavailability should always be avoided. With the parallel processing feature of the hierarchical database systems, the concern with database outage is virtually eliminated, as when one of the sub systems is down for any reason, the remaining subsystems will continue to provide database and transaction services.

Therefore, in order to ensure a complete data reliability, these large database systems must be frequently maintained by a skilled staff of database administrators who are responsible for managing and maintaining the datasharing subsystems.

Typically, the database administrators perform database administration operations at subsystem levels, whereby individual sub systems are maintained by the system administrators. These administration operations are generally comprised of tasks such as such as imaging or backup, reorganization, statistics collection, and database space growth management. However, as the complexity in the enterprise database systems grows, the subsystem administration becomes inefficient and costly due to an accompanied increase in the database administration staffing requirement. Furthermore, because datasharing subsystems are individually maintained, they are not completely identical. Thus, as time goes on, the differences in the systems may magnify and the tasks of database administration may become more difficult to manage.

Thus, to address the need to increase efficiency and reduce manpower cost of database management, a single point of control (SPOC) concept is introduced. This concept enables subsystem level operations through a single point of control, whereby administration operations can be performed on multiple sub systems using a single command execution.

Typically, in a single point of control network, a database administrator may select the entire datasharing system or a subset of subsystems for administration operations. Using a database administration application, the database administrator sends an instruction or a system command to the single point of control. Upon execution, the single point of control returns the results of the instruction to the database administrator.

An administrator can send a command to list the resources in the data sharing system. The result is a response from each subsystem with its list of resources. For example, the results may list resources that identify transactions and their associated attributes that are maintained on a datasharing subsystem. When all the queried datasharing subsystems return their results, the information is assembled in a table and presented to the database administrator. With this information, the database administrator examines for exception states that may exist therein.

In a datasharing system, resources must be defined in the same way on each subsystem to ensure that each subsystem will process application work in the same way. By definition then, an exception state is a condition whereby a difference exists in an object attribute of a resource. An exception state may indicate that the resource is not working correctly and not supporting applications properly. This might eventually result in application unavailability or in a corruption of data that will require the database administrator to perform further database administration operations such as backup, reorganization, statistics collection, and addition of database objects. This exception-based approach to database management is commonly employed in the database administration.

Thus, detecting exception states in a database is central to the successful database management. Because large enterprise database systems are typically comprised of several hundreds or thousands of database objects, exception state identification becomes very difficult and labor-intensive. To implement this task, database administrators must analyze the database using their own database administration tools, products provided by the database management system, or utilities available from third-party vendors. These tools collect and report the indicators that help identify objects in the exception state.

As an example of the conventional database administration tools used for detecting exception states in a database, reference is made to FIG. 1, which illustrates a table of information 20 returned from the execution of an instruction command by the single point of control. Table 20 of the conventional database administration tools is comprised of two main features that define a database system (or system group) 100 shown in FIG. 2: resources 30 and attributes 35.

Each resource 30 is comprised of a transaction 40 and a member 45. The transaction 40 represents a name or identification of a database object that maintains a pointer to the data structure. The member 45 is a designated identification for each datasharing subsystem, i.e., 111, 112, 115 as part of the database system 100 (FIG. 2).

Associated with each resource 30 are a set of attributes 35, which can be, for example, further comprised of a local class 55, a segment size 60, and a status attribute 65. These individual attributes may be defined in any manner deemed suitable and meaningful to a database administrator.

Since it is a goal of the database administrator to know if an exception state exists in a resource definition among all the selected datasharing subsystems, upon issuing a query for exception state detection using the conventional database administration tool, the single point of control returns the information in Table 20 as illustrated in FIG. 1. This information is usually arranged in an alphabetical order of the member 45, which identifies the corresponding datasharing subsystem 111, 112, 115. Thus, the transaction 40 and the associated attributes 35 are grouped according to the member 45. As an example, referring to FIG. 1, the transaction 40, labeled as "TRAN1" is displayed in various non-contiguous rows of Table 20 such as in rows 1, 7, 13, and 19 corresponding to the members 45 labeled as "IMS1," "IMS2," "IMS3," "IMS4," respectively.

In order to identify an exception state from the information above, the database administrator must perform a two-dimensional search of table 20. The first search is performed row by row to locate the transaction 40, and the second search is performed column by column to identify differences in the object attributes 35 associated with the transaction 40. For example, a two-dimensional search first in rows 1, 7, 13, and 19, and then columns 3, 4, and 5 returns an exception state in the local class 55 from the member 45 labeled as "IMS3."

Normally, this two-dimensional search is performed manually by the database administrator to identify exception states. Because large enterprise database systems can be comprised of hundreds of thousand of resources 30 and attributes 35, spreading across a large number of remotely networked datasharing subsystems, this conventional database administration method therefore bears a significant disadvantage for large enterprise database administration because of its inefficiency and time-consuming labor required to perform manual two-dimensional searches.

Thus, there still remains an unsatisfied need for an improved method for large enterprise database administration. Preferably, the improved method should eliminate the need for a manual two-dimensional search in the exception state identification. Moreover, the improved method should greatly facilitate the exception state detection by providing an enhanced visual method of displaying resources and attributes. These desirable attributes of the improved method for large enterprise database administration should achieve the goal of increased efficiency, which would lead to a reduced cost of database administration operations.

SUMMARY OF THE INVENTION

It is a feature of the present invention to provide an improved system and associated method for exception state detection to be used in large enterprise database and transaction administration operations. The system and method for exception state detection according to the present invention utilize an enhanced organization for flagging differences in resource definitions and status across multiple datasharing subsystems.

The system and method of the present invention presents several other features, among which are the following:

A table for displaying resource information, with each row in the table defining each resource on each system, and each column defining each resource characteristic or attribute.

All resources are grouped by name across multiple subsystems.

All resources of the same name are displayed in a single "roll-up" row in the table with all common resource attributes visible.

Expandable roll-up row for showing each individual resource have the same name on each subsystem.

Comparison of resource attributes and identification of differences across multiple subsystems for resources having the same name.

Flagging of a cell in the roll-up row where differences exist.

Flagging of a single resource attribute on one subsystem that differs from the resources having the same name on the other subsystems.

Flagging of all resource attributes when two or more resources of the same name have values different from those on the other subsystems.

Identification of a resource that is defined on one or more systems, but not on the other subsystems.

Insertion of a flagging row for a resource that is missing from one or more subsystems.

Specification of a single column for which differences exist.

Removal of all other columns when a single column's differences have been requested.

Showing of roll-up rows with differences at the top of the table, and regular rows with no differences at the bottom.

Expansion of roll-up rows when differences are identified.

These features afford the system and method of the present invention significant advantages over conventional systems and methods for database and transaction administration in the ability to simplify the views of multiple systems into a single system image, and the ability to provide a significant degree of flexibility in displaying database information, thus making it relatively easy to identify resources that do not necessarily conform to the single system definition. These advantages therefore substantially enhance the efficiency of the database and transaction administration operations and reduce the labor demand associated with performing two-dimensional searches for exception states used in the conventional method for database and transaction administration.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 1 is a table of database information based on a prior art method, showing resource definitions arranged in the order of member subsystems;

FIG. 4 is a table of database information returned from the single point of control execution using the exception state detection system and method of FIGS. 2 and 3, illustrating a tool bar comprised of a plurality of icons that are designed to implement various special features of the present invention;

FIG. 5 is a display of a table of database information based on the selection of one of the six icons in the table of FIG. 4, incorporating various features such as roll-up row, data grouped by transaction names, flagging differences in resource attributes based on various rules of display, and reordering of the present invention;

FIG. 6 is a table of database information based on the selection of one of the six icons in the table of FIG. 4, displaying only columns of flagged attributes for which differences exist, while columns of attributes with no difference are removed from view;

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standards protocols to form a global, distributed network.

Table: Data arranged in rows and columns. A spreadsheet is an example of a table. In a relational database management system, the information can be stored in the form of tables.

Imaging: A process of backing up data from one computer system to another by making a mirror image of the data of the system to be backed up available on another system.

Difference: A comparison process of two or more object attributes that results in one or more object attributes not being the same as the others. A difference defines an exception state.

Figure 2:
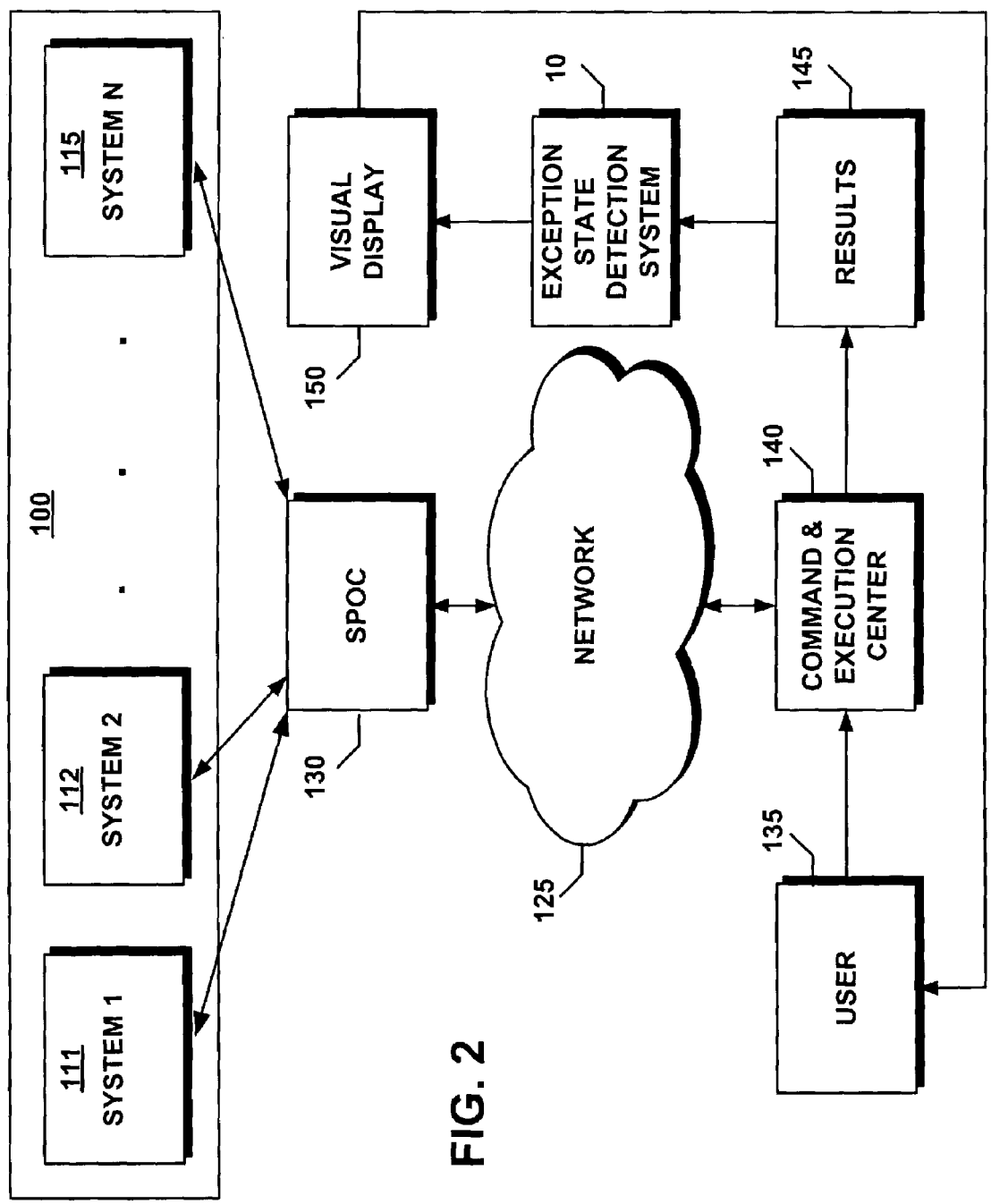
FIG. 2 is a schematic illustration of an exemplary hierarchical database system comprising multiple datasharing subsystems operating in a single point of control (SPOC) network, which utilizes the exception state detection system of the present invention for database and transaction administration operations.

FIG. 2 portrays an overview of a hierarchical database and management system (also referred to herein as database system) 100 which is comprised of a plurality of physical datasharing subsystems, i.e., 111, 112, 115, hereinafter also referred to as member systems 111, 112, 115. Each of the member systems 111, 112, 115 is a computer device capable of data manipulation, storage, networking, and human interfacing via keyboard, pointing device, and video display terminal, etc. Each of the member systems 111, 112, 115 includes an operating system that controls various computing functions.

The member systems 111, 112, 115 also include a collection of software that enable specialized computing purposes not provided by the operating system. This software collection may be further divided into business applications and administration applications. These applications provide the member systems 111, 112, 115 the ability to collect and store real-time information into a relational database table.

Through the use of client/server applications on the member systems 111, 112, 115 or on a host server, a communication network 125 is formed, allowing the member systems 111, 112, 115 to interchange data among themselves and providing communication to the Internet or World Wide Web (WWW).

A single point of control (SPOC) application 130 residing in each of the member systems 111, 112, 115 allows a distributed computing, whereby the single point of control application is connected to the communication network 125 to allow a remote user (represented by block 135), who may be a database administrator, to query the member systems 111, 112, 115 for desired information.

Operating through the communication network 125, the single point of control application 130 acts as a data center to disseminate the command input by the user 135 to the member systems 111, 112, 115 via a command and execution center 140, and to organize the data returned from each member system 111, 112, 115 into a collection of results 145. With reference to FIGS. 4 through 9, the results 145 are preferably displayed in a tabular form.

An exception state detection system 10 of the present invention interfaces with and operates on the results 145. The system 10 includes a software programming code or computer program product that may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems.

The exception state detection system 10 may be embedded within the member systems 111, 112, 115 or installed on a host server. The exception state detection system 10 provides various features to identify and present exception states in a visual format display 150 to the user 135. These features will be further described in connection with FIGS. 4 through 9.

Based on the information presented by the exception state detection system 10, the user 135 may elect to perform database administration operations. For example, the user 135 may want to perform an image operation on one or more of the member systems 111, 112, 115 so that the identical (duplicate or cloned) copies of the most current database information would selectively exist in all the member systems 111, 112, 115. This operation is also known as backup or cloning.

Figure 3:
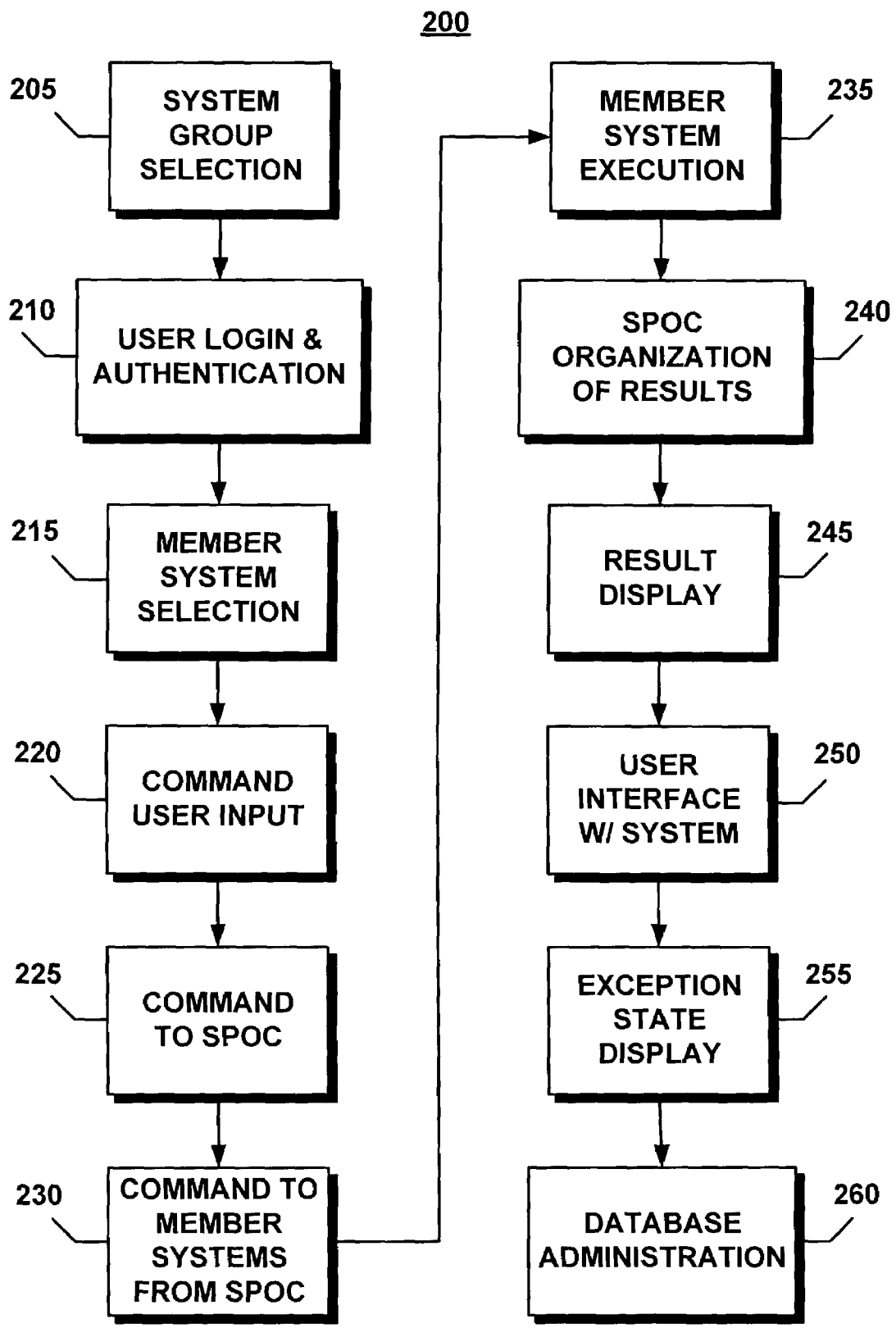
FIG. 3 is a process flow chart of the single point of control network interface and execution during a database or transaction administration operation using the exception state detection system of FIG. 2.

FIG. 3 illustrates a method of operation 200 implemented by the exception state detection system 10 according to the present invention. Method 200 is comprised of several steps operating in sequence; namely: user selection of system group (step 205), user authentication (step 210), user selection of member systems (step 215), command initiation by the user (step 220), command transmittal to single point of control (step 225), command dissemination to member systems (step 230), command execution by member systems (step 235), return of results from member systems to the single point of control (step 237), organization of returned results by single point of control (step 240), result display (step 245), user interface (step 250) with the exception state detection system 10, exception state display (step 255), and database administration operation (step 260). Each of these steps will now be described in more detail.

Method 200 starts in step 205 by having the user 135 make a selection of the system group 100 (FIG. 2) on which to perform the exception state detection (or maintenance) operation. The user 135 then logs onto the host server by providing an authentication using username and password in step 210.

In step 215, upon entering the host server, the user 135 then makes a selection of a subset or the entirety of the member systems 111, 112, 115 on which to perform the exception state detection operation. The user 135 enters a command for execution in step 220. The command can be entered in a command line interface or with the assistance of a software guide known as "wizard." A typical command could be for example, a query for resources, for displaying the resources associated attributes, for performing a system operation such as creating, deleting, or modifying resources, and so forth.

In step 225, the command is transmitted to the single point of control 130 operated on the host server 120 via the command and execution center 140. In step 230, upon receiving the command, the single point of control 130 distributes the command to each of the selected member systems 111, 112, 115 for execution.

In step 235, each of the selected member systems 111, 112, 115 executes the command and returns the results to single point of control 130. The results may be a collection of resources and attributes identified by the member systems 111, 112, 115.

In step 240, the single point of control 130 gathers all the results returned from each of the selected member systems 111, 112, 115 and combines them into a single collection of results 145, which is then sent to the command and execution center 140 (FIG. 2).

In step 245, the command and execution center 140 displays the collection of results 145 in a tabular format (i.e., tables 300, 400, 500, 600, 700, 800). In step 250, the user interfaces with the exception state detection system 10 to identify differences in the resources and attributes from the tables 300, 400, 500, 600, 700, 800.

The exception state detection system 10 displays the desired view of the exception states to the user 135 in step 255. Based on the information presented by the exception state detection system 10, the user 135 may elect to perform further database administration operations in step 260.

With reference to FIG. 4, the table 300 displays the collection of results 145 returned from the member systems 111, 112, 115 in step 245 of method 200 of FIG. 2. Generally, the table 300 is comprised of resources 305 and attributes 310. Each resource 305 is further comprised of a transaction name 315 and the member system 111, 112, 115 as identified in the headers of first and second columns of table 300.

The attributes 310 define the characteristics of the resource 305, which, for example only, may be further comprised of a local class 320, a segment size 325, and a status 330, as identified in the headers of the third to fifth columns. These individual attributes may also be defined in any other manner deemed suitable and meaningful to the user 135.

As an example, the results 145 fill the table 300 in rows 1 to 24 and columns 1 to 5. The results 145 are typically displayed by the command and execution center 140 in a member-priority sorted arrangement. That is, the results 145 are grouped first by the member system 111, 112, 115, as shown in column 2. For example, the results 145 returned from the member system 111, 112, 115 designated as "IMS1" are in rows 1 to 6 of column 2. Then, sequentially thereafter, the results 145 returned from the member system labeled as "IMS2", "IMS3," and "IMS4," occupy rows 7 to 12, 13 to 18, and 19 to 23 of column 2, respectively.

Within each of these member-priority subsets of data, the transaction names 315 are presented in an alphabetical order in column 1. For example, the transaction names 315 labeled as "TRAN1," "TRAN2," "TRAN3," "TRAN4," "TRAN5," and "TRAN6," occur in rows 1 to 6 of column 1, respectively, for the member system labeled as "IMS1."

As an example, the local class 320 has a numeric integer representation from 1 to 6 as its attribute value. Similarly, the attribute value of the segment size 325 is a numeric integer representation from 0 to 4. The status 330 is represented by a word string value of "Stopped" or "Active". Thus, for any particular transaction name 315 on a particular member system 111, 112, 115, any attributes values of local class 320, segment size 325, and status 330 can exist. For example, the transaction name 315 "TRAN1" for the member system "IMS1" in row 1 and column 1 has an attribute value of 1 for the local class 320, an attribute value of 0 for the segment size 325, and attribute value of "Stopped" for the status 330.

A tool bar 335 is displayed at the bottom of the table 300 on the screen. The tool bar 335 is comprised of a plurality of icons or buttons 340, 345, 350, 355, 360, and 365. Each of these icons provides a specialized function to display and flag differences found in the values of the attributes 310. In a preferred embodiment, the method of flagging differences involves highlighting one or more cells of the attributes 310 by changing the color or shading of the cells. It should be understood that other methods of flagging could be used in place of highlighting to suit the needs of the user 135, especially those of the handicapped, visually impaired, or colorblind users.

According to the present invention, the icon 340 is labeled "Highlight all member differences," and causes the system 10 to highlight all the differences found in all the attributes 310. The icon 345 labeled "Highlight member differences for selected column" causes the system 10 to highlight differences found in the selected attributes 310.

The icon 350 labeled "Highlight all member differences with roll-up" causes the system 10 to highlight all differences found in all the attributes 310 in a roll-up row view. The icon 355 labeled "Highlight member differences for selected column with roll-up" causes the system 10 to highlight differences found in the selected attributes 310 in a roll-up row view. The icon 360 labeled "View all" causes the system 10 to provide a complete view of the collection of results 145 as shown in Table 300.

Therefore, the user 135 can invoke various views of the differences in the values of the attributes 310 by selecting one of the icons in the tool bar 335 with a keyboard, a pointing device, or another input device. Upon selecting an icon, the exception state detection system 10 performs a search algorithm and displays the requested views in tabular form, such as table 400 in FIG. 5, table 500 in FIG. 6, table 600 in FIG. 7, table 700 in FIG. 8, and table 800 in FIG. 9. Thus, the requested views are made accessible by the tool bar 335 in any of these tables 300 to 800 upon selecting an appropriate icon 340 to 360.

When the user 135 selects the icon 340 "Highlight all member differences," the command and execution center 140 (FIG. 2) displays the results 145 in a table 400 as shown in FIG. 5. Table 400 provides a view of all differences in the values of the attributes 310 associated with the resource 305. The results 145 are generally displayed in a transaction-priority sorted arrangement. That is the results 145 are grouped by the transaction name 315 in column 2.

Furthermore, to provide a clear separation between groups of attributes 310 associated with each transaction name 315, a divider row 405 feature is added. The divider rows 405 are interposed between groups of attributes 310. For example, row 1 of table 400 is a divider row 405 with the label "TRAN1" to signify that the following group of attributes 310 occupied in rows 2 to 5 belongs to the transaction name 315 "TRAN1". The divider row 405 in row 6 labeled as "TRAN2" provides a clear demarcation between the group of attributes 310 associated with the transaction names 315 "TRAN1" and "TRAN2."

With reference to FIG. 5, within each transaction-priority group of attributes 310, the member systems 111, 112, 115 are sorted in alphabetical order in column 3. For example, the member systems "IMS1," IMS2," "IMS3," and "IMS4" are located in rows 2 to 5 of column 3.

The attributes 310 comprising the local class 320, the segment size 325, and the status 330 occupy columns 4 to 6 corresponding to each resource 305 as defined by the transaction name 315 and the member system 111, 112, 115. For example, the attribute values of the local class 320, the segment size 325, and the status 330 for the transaction name 315 "TRAN1" and the member system "IMS1" are 1, 0, and "Stopped," respectively, as shown in row 2 of table 400.

Referring now to FIG. 5, whenever a difference exists in one of the attributes 310 corresponding to a transaction name 315 across the member systems 111, 112, 115, that difference is flagged, such as by highlighting, to identify an exception state. There are two preferable types of rules for flagging (or highlighting) the differences: a single difference rule, and a multiple difference rule.

To illustrate these rules, reference is made to rows 2 to 5 of column 4 in table 400, wherein the local class attribute 320 of the transaction name 315 "TRAN1" possesses values 1, 1, 2, and 1 for the respective member systems "IMS1," "IMS2," "IMS3," and "IMS4". Thus, the attribute value of the local class 320 for the transaction name 315 "TRAN1" from the member system "IMS3" is different from those of the remaining member systems. As a result of this difference, the cell containing this attribute value for the local class 320 in row 4 and column 4 is highlighted. This highlighting or flagging feature thus features the single difference rule.

Referring to FIG. 5, the single difference rule is also used for highlighting a difference in the attribute value of the segment size 325 of the transaction name 315 "TRAN5" from the member system 115 "IMS3" in row 14 and column 5.

Still with reference to FIG. 5, the attribute values of the status 330 in column 6 for the transaction name "TRAN2" are "Stopped," "Stopped," "Active," and "Active," corresponding respectively to the member systems "IMS1," "IMS2," "IMS3," and "IMS4." In this example, there exist more than one difference. Thus, all the attribute values are highlighted as shown in rows 7 to 10 and column 6. This flagging or highlighting illustrates the multiple difference rule.

To facilitate the display of table 400 of FIG. 5, an expandable roll-up row interface 410 feature is implemented in column 1 of table 400, and is designated by either a symbol "v" or ">". The roll-up row interface 410 symbol "v" denotes an expanded view, while the symbol ">" denotes a collapsed view of a group of attributes 310 associated with the transaction name 315.

Thus, the roll-up row interface 410 provides a compressed view of the results 145 by eliminating expanded view of groups of attributes 310 wherein no difference is detected. For example, the attributes 310 for the transaction names 315 "TRAN1," "TRAN2," and "TRAN5" are displayed in an expanded view as indicated by the roll-up row interface 410 symbol "v" in column 1 spanning rows 1 to 15. In contrast, the attributes 310 for the transaction names 315 "TRAN3," "TRAN4," and "TRAN6," for which no difference is detected, are displayed in a collapsed view with only divider rows 405 shown, as indicated by the roll-up row interface 410 symbol ">" in column 1 and rows 16 to 18.

Another feature of the present invention presented in the table 400 is a reordering process whereby the transaction names 315 with differences in the attribute values 310 are displayed in precedence of those without differences. For example, the transaction names 315 "TRAN1," "TRAN2," and "TRAN5," whose attribute values are different, precede the transaction names 315 "TRAN3," "TRAN4," and "TRAN6" whose attribute values do not differ.

The tool bar 335 is displayed at the bottom of the table 400 with icons 340, 345, 350, 355, and 360 that provide a user interface for accessing different views of exception states.

In the event the user 135 wishes to query for differences for a selected attribute 310, the user 135 first selects a column in any of tables 300, 400, 500, 600, 700, or 800 corresponding to that attribute 310, by selecting or highlighting the column of interest using a conventional method of dragging the cursor using a pointing device or any other methods. Upon selection of the selected column, the user 135 then selects the icon 345 "Highlight member differences for selected column," using a keyboard, a pointing device, or any other input devices; whereupon the command and execution center 140 displays the results 145 in table 500 shown in FIG. 6.

For example, the user 135 wishes to query differences for the status attribute 330 in either table 300 or 400, or any other table. With reference to FIGS. 5 and 6, the user 135 selects or highlights column 5 of table 300 or column 6 of table 400 corresponding to the status 330. The user 135 then selects icon 345, whereupon table 500 of FIG. 6 comes into view.

Table 500 provides a view of differences in the attribute values of the status 330 associated with the resource 305. The results 145 are displayed in a transaction-priority sorted arrangement as in table 400 with the reordering 415 in effect. Since the differences in the attribute values of the status 330 occur in the transaction name "TRAN2" as shown in the table 400 of FIG. 5, the transaction name "TRAN2" is displayed in precedence of the other transaction names 315.

Because table 500 displays only the view of the differences for the selected attribute 310, only the column corresponding to the selected attribute 310 is displayed while the columns for the other attributes 310 are hidden from view. In particular, table 500 displays the status attribute 330 in column 4 because this attribute 310 is selected. Moreover, the attribute values for the selected attribute 310, or in this example the status 330, are highlighted in the cells from rows 2 to 5 and column 4 to indicate exception states to the user 135. The removal of the other columns is optional and may not always be desired. In some implementations it is possible to remove the columns that were not selected and in other implementations it is possible to keep all of the columns.

Table 500 also implements the divider row feature 405 as in table 400, to provide a clear visual separation between the transaction names 315. For example, row 6 of table 500 is a divider row 405 between the transaction names "TRAN2" and "TRAN1."

Table 500 also features the roll-up row interface 410 in column 1 as in table 400 to provide a compressed view of the transaction names 315 whose selected attribute 310 do not differ. In this example, the status attribute 330 for the transaction names 315 "TRAN1," "TRAN3," "TRAN4," "TRAN5," and "TRAN6," do not have an exception state, hence these transaction names 310 are displayed in a collapsed view with only divider rows 405 as shown, as indicated by the roll-up row interface 410 symbol ">" in column 1 and rows 6 to 10. In contrast, the transaction name 315 "TRAN2" is displayed in an expanded view as indicated by the roll-up row interface 410 symbol "v" in column, because the status attribute 330 for this transaction name 315 contains differences in its attribute values.

Another feature of the present invention is the ability for the exception state detection system 10 of the present invention to detect a missing resource 305 from a member system 111, 112, 115, thereby providing a row insertion for the missing resource 305. This missing resource detection is automatically invoked whenever table 400 or table 500 is in view.

Figure 7:
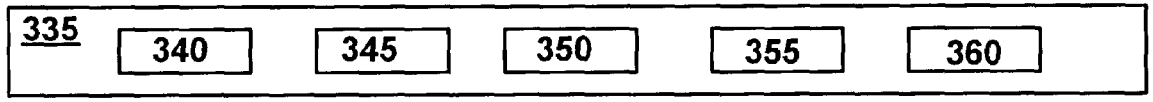
FIG. 7 is a table of database information based on the selection of one of the six icons of the table of FIG. 4, showing a row insertion where a transaction on one of the member systems is not defined.

For example, with reference to FIG. 7, table 600 shows that the transaction name 315 "TRAN2" are defined only on the member systems "IMS1," "IMS2," and "IMS3," but not on "IMS4." Accordingly, row 5 of the table 600 is inserted and highlighted. The value in the transaction name 315 for the member system "IMS4" is displayed as "Missing TRAN2" in column 2 to alert the user 135 of this occurrence. The value in the status attribute 330 in column 4 is not available, hence left blank.

In tables 300 and 400, the differences in the attribute values for all the attributes 310, namely, the local class 320, the segment size 325, and the status 330, are displayed and highlighted for every member system 115. On occasion, the user 135 may wish to view a summary of the differences for all the attributes 310. Accordingly, the user 135 selects the icon 350 "Highlight all member differences with roll-up" in the toolbar 335 in any of the tables 300 to 800. Upon selection, the command and execution center 140 displays a view in the table 700 as shown in FIG. 8.

Figure 8:
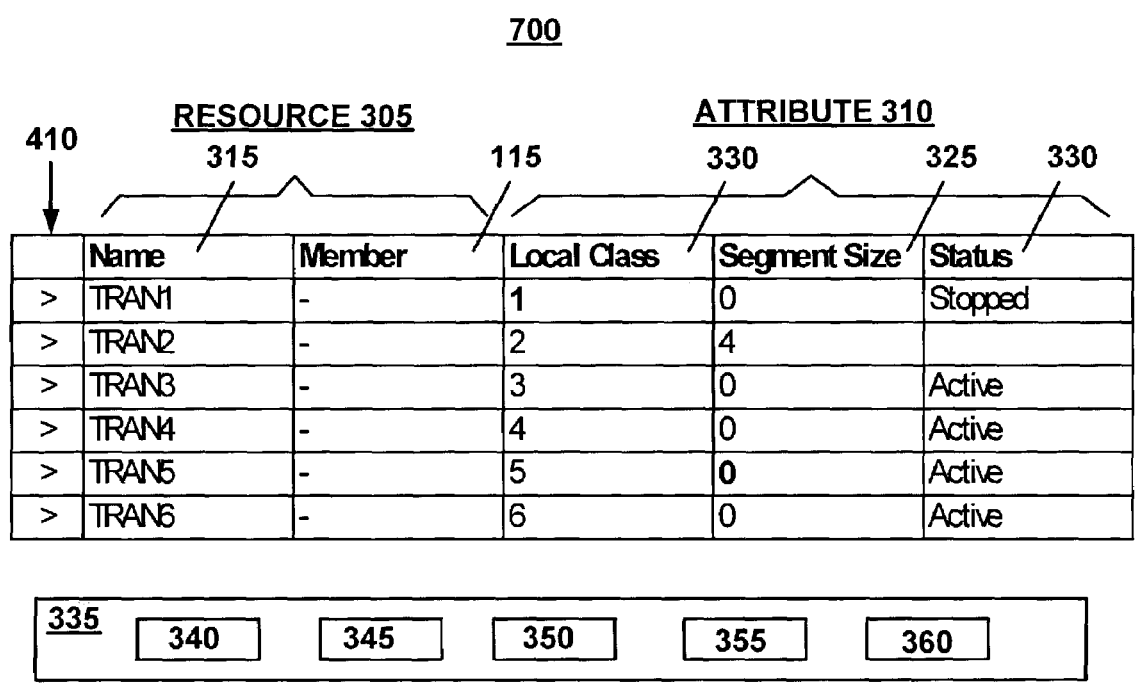
FIG. 8 is a table of database information based on the selection of one of the six icons of the table of FIG. 4, showing a "difference roll-up," wherein the transactions are displayed in each row along with all columns of attributes, which are flagged if differences exist based on various rules of display.

With reference to FIG. 8, table 700 displays a view of all the differences in the values of the attributes 310 associated with the transaction names 315 in a transaction-priority sorted arrangement. That is, the transaction names 315 are displayed in their alphabetical order as shown in rows 1 to 6 and column 2. Furthermore, for summary purpose, the transaction names 315 are all shown in a collapsed view, as indicated by the roll-up row interface 410 symbol ">" in column 1. Since the transaction names 315 are displayed in a collapsed view, the divider row feature 405 may be superfluous in table 700, and thus is not shown. Furthermore, the member system resource 115 in column 4 does not contain any value, because the table 700 provides a summary view across the selected member systems 115

With further reference to FIG. 8, the attributes 310 are displayed in columns 4, 5, and 6 corresponding to the local class 320, the segment size 325, and the status 330, respectively. Whenever differences exist for any of these attributes 310, the corresponding cells are highlighted according to two rules: a majority value rule, and the multiple difference rule.

To illustrate the majority value rule, reference is made to column 4 of row 1 corresponding to the local class 320 for the transaction name 315 "TRAN1". With reference to FIG. 5, the attribute values of the local class 320 for transaction name 315 "TRAN1" are 1, 1, 2, and 1 from the member systems 115 "IMS1," "IMS2," "IMS3," and "IMS4." Since there exists a single difference in the attribute values of the local class 320, namely, 2, the majority value, which is 1, is displayed and highlighted as shown in the cell in row 1 and column 4. Similarly, the cell in row 5 and column 5 corresponding to the segment size 325 for the transaction name 315 "TRAN5" is also highlighted according to the majority value rule.

When several differences exist in the attribute values, the multiple difference rule is invoked. In this case, the status attribute 330 for the transaction name 315 "TRAN2" has attribute values of "Stopped," "Stopped," "Active," and "Active" from the member systems "IMS1," "IMS2," "IMS3," and "IMS4." Thus, multiple differences exist, whereby according to the multiple difference rule, the cell corresponding the status 330 is highlighted but contains no attribute value as shown in the cell in row 2 and column 6.

Figure 9:
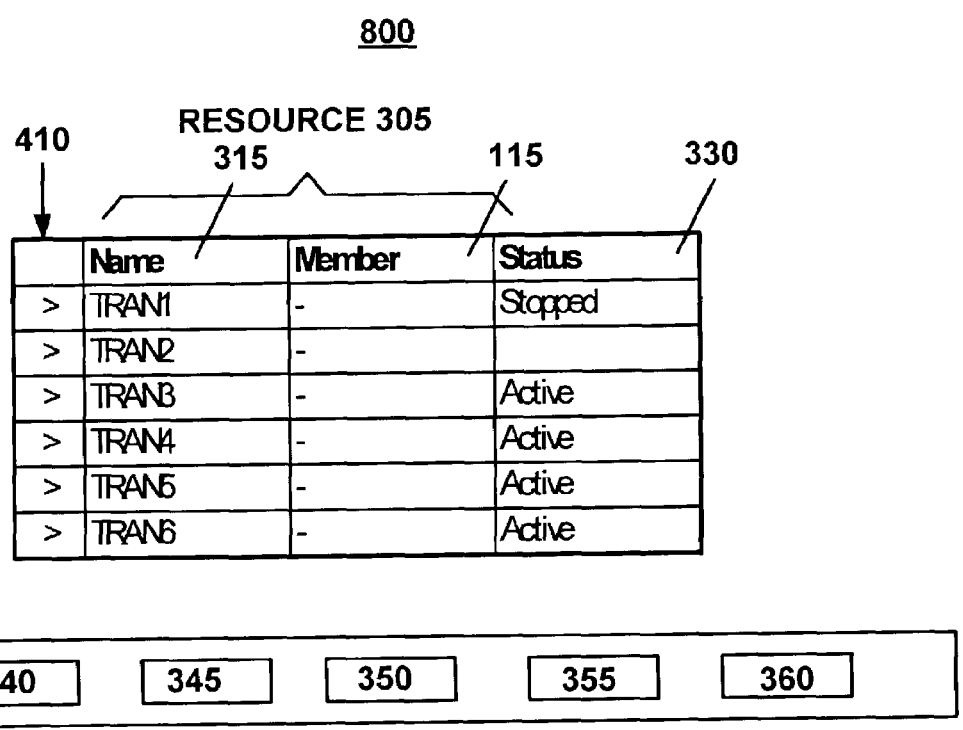
FIG. 9 is a table of database information based on the selection of one of the six icons of the table of FIG. 4, illustrating a "difference roll-up," wherein the transactions are displayed in each row along with only columns of selected attributes for which differences exist.

The user 135 also has the option of viewing the summary of the results 145 for a selected attribute 310 by selecting the icon 355 "Highlight member differences for selected column with roll-up" in the tool bar 335. Upon selection, the command and execution center 140 displays a view in the table 800 as shown in FIG. 9.

For example, the user 135 wishes a summary view for a selected attribute 310, namely, the status 330. With reference to FIG. 9, the table 800 displays a summary view of the results 145 in a transaction-priority sorted arrangement, with the transaction name 315 being displayed in an alphabetical order in rows 1 to 6 and column 2. Because table 800 is a summary view across multiple member systems 115, it only provides a collapsed view of the transaction names 315. The roll-up row interface 410 symbol ">" in column 1 indicates this effect.

Since the status 330 is selected, it is displayed in column 4, while the other attributes are hidden from view. When there exist differences in the attribute values for the selected attribute 310, the cell corresponding to that attribute 310 for the transaction name 315 is highlighted based on the aforementioned majority value rule or multiple difference rule. In particular, the selected status attributes 330 differ in value for the transaction name 315 "TRAN2" according to the multiple difference rule, as described previously. Therefore, the cell in row 2 and column 4 is highlighted but no value is displayed.

Similar to table 700 for the summary view for all the differences, the divider row 405 may not be available in the table 800. In addition, the cells in column 3 corresponding to the member systems 111, 112, 115 are empty because the member systems 115 are all different.

At any instance of the exception state detection process in any of the tables 400 to 800, the user 135 can always return to the default view of the table 300 by selecting the icon 360 "View all," upon which the table 300 comes into view. Normally, table 300 is not particularly useful for detecting exception states, as the user 135 generally interfaces with the results 145 using the icons 340 to 355 for accessing different views of the possible exception states. In this capacity, the exception state detection system 10 proves to be highly advantageous over the conventional method. Accordingly, the process of exception state detection is substantially streamlined and much more efficient, thereby resulting in significant labor reduction and cost savings.

It should be understood that the features, compositions, and procedures of the elements described herein can be modified within the scope of the invention and are not intended to be the exclusive; rather, they can be modified within the scope of the invention. Other modifications can be made when implementing the invention for a particular environment.

What is claimed is:

1. A computer implemented method for flagging differences in attributes across multiple database systems, comprising:
   collecting the attributes from the multiple database systems;
   grouping the attributes in groups, by resource identifiers, across the multiple database systems;
   comparing the attributes across the multiple database systems, within each group;
   identifying the differences between the attributes for a same resource identifier, within each group, across the multiple database systems;
   flagging exception states associated with the differences having been identified;
   wherein collecting the attributes from the multiple database systems comprises collecting the attributes in a table form;
   wherein collecting the attributes in the table form comprises presenting the attributes in a table form comprised of a row for each resource on each database system and a column for each attribute; and
   rearranging rows to display roll-up rows with differences between the attributes at the beginning of the table, and other rows at the end of the table.

2. The method of claim 1, wherein flagging exception states comprises providing a visual indication reflecting the differences between the attributes for the same resource identifier.

3. The method of claim 2, wherein providing the visual indication comprises highlighting the differences between the attributes for the same resource identifier.

4. The method of claim 1, wherein flagging exception states comprises providing an audible indication reflecting the differences between the attributes for the same resource identifier.

5. The method of claim 1, wherein grouping the attributes in groups, by resource identifiers, comprises grouping the attributes by transaction names.

6. The method of claim 5, wherein grouping the attributes in groups, by resource identifiers, further comprises grouping the attributes by database system names.

7. The method of claim 6, wherein flagging the exception states comprises flagging all the attributes when two or more attributes corresponding to a same transaction name and database system name, are different from attributes corresponding to the same transaction name but different database system names.

8. The method of claim 6, wherein flagging the exception states comprises inserting and flagging a row for a resource identifier missing from one or more database systems.

9. The method of claim 6, wherein flagging the exception states comprises flagging a column having differences between the attributes have been identified.

10. The method of claim 6, further comprising selecting a single column having differences between the attributes have been identified; and
    removing all other columns that have not been selected.

11. The method of claim 1, further comprising performing administration operations based on the exception states having been flagged.

12. The method of claim 1, wherein flagging the exception states comprises flagging all the differences identified between the attributes.

13. The method of claim 1, wherein flagging the exception states comprises flagging the differences identified in selected attributes.

14. The method of claim 1, wherein flagging the exception states comprises flagging a cell in a roll-up row associated with differences identified between the attributes.

15. The method of claim 1, wherein flagging the exception states comprises flagging a single attribute on one database system wherein the single attribute differs from the attributes on other database systems.

16. The method of claim 1, wherein flagging the exception states comprises flagging a resource defined on one or more database systems, but not on other database systems.

17. The method of claim 1, further comprising automatically expanding the roll-up rows.

18. A computer program product having a plurality of executable instruction codes stored on a computer-readable medium, for flagging differences in attributes across multiple database systems, comprising:
    a first set of instruction codes for collecting the attributes from the multiple database systems and for grouping the attributes in groups, by resource identifiers, across the multiple database systems;
    a second set of instruction codes for comparing the attributes across the multiple database systems, within each group, and for identifying the differences between the attributes for a same resource identifier, within each group, across the multiple database systems;
    a third set of instruction codes for flagging exception states associated with the differences having been identified;
    wherein the first set of instruction codes for collecting the attributes from the multiple database systems collects the attributes in a table form;
    wherein the first set of instruction codes for collecting the attributes in the table form presents the attributes in a table comprised of a row for each resource on each database system and a column for each attribute; and
    wherein the third set of instruction codes rearranges rows to display roll-up rows with differences between the attributes at the beginning of the table, and other rows at the end of the table.

19. The computer program product of claim 18, wherein the third set of instruction codes for flagging exception states provides a visual indication reflecting the differences between the attributes for the same resource identifier.

20. The computer program product of claim 19, wherein the third set of instruction codes provides the visual indication by highlighting the differences between the attributes for a same resource identifier.

21. The computer program product of claim 19, wherein the second set of instruction codes groups the attributes by transaction names.

22. The computer program product of claim 21, wherein the second set of instruction codes further groups the attributes by database system names.

23. The computer program product of claim 22, wherein the third set of instruction codes flags the exception states by inserting and flagging a row for a resource identifier missing from one or more database systems.

24. The computer program product of claim 22, wherein the third set of instruction codes flags the exception states by flagging a column having differences between the attributes have been identified.

25. The computer program product of claim 22, wherein the third set of instruction codes removes all columns have not been selected.

26. The computer program product of claim 19, wherein the third set of instruction codes flags the exception states identified in selected attributes.

27. The computer program product of claim 19, wherein the third set of instruction codes flags a cell in a roll-up row associated with differences identified between the attributes.

28. The computer program product of claim 18, wherein the third set of instruction codes provides an audible indication reflecting the differences between the attributes for the same resource identifier.

29. The computer program product of claim 18, wherein the third set of instruction codes flags all the differences identified between the attributes.

30. A computer implemented system for flagging differences in attributes across multiple database systems, comprising:
   a processor;
   means for collecting the attributes from the multiple database systems and for grouping the attributes in groups, by resource identifiers, across the multiple database systems;
   means for comparing the attributes across the multiple database systems, within each group, and for identifying the differences between the attributes for a same resource identifier, within each group, across the multiple database systems;
   means for flagging exception states associated with the differences having been identified;
   wherein the means for collecting the attributes from the multiple database systems collects the attributes in a table form;
   wherein the means for collecting the attributes in the table form presents the attributes in a table form that is comprised of a row for each resource on each database system and a column for each attribute; and
   means for rearranging rows to display roll-up rows with differences between the attributes at the beginning of the table, and other rows at the end of the table.

31. A computer implemented method for flagging differences in attributes across multiple transaction management systems, comprising:
   collecting the attributes from the multiple transaction management systems;
   grouping the attributes in groups, by resource identifiers, across the multiple transaction management systems;
   comparing the attributes across the multiple transaction management systems, within each group;
   identifying the differences between the attributes for a same resource identifier, within each group, across the multiple transaction management systems;
   flagging exception states associated with the differences having been identified;
   wherein collecting the attributes from the multiple transaction management systems comprises collecting the attributes in a table form;
   wherein collecting the attributes in the table form comprises presenting the attributes in a table form that is comprised of a row for each resource on each transaction management system and a column for each attribute; and
   rearranging rows to display roll-up rows with differences between the attributes at the beginning of the table, and other rows at the end of the table.

32. The method of claim 31, further comprising performing administration operations based on exception states that have been flagged.

* * * * *